(12) United States Patent
Vulih et al.

(10) Patent No.: US 8,305,070 B2
(45) Date of Patent: Nov. 6, 2012

(54) PROGRAMMABLE POWER SUPPLY CONTROLLER AND METHODOLOGY FOR AUTOMATIC PHASE ADJUSTMENT OF A PWM OUTPUT SIGNAL

(75) Inventors: Salomon Vulih, Hillsborough, NJ (US); Timothy Maher, Branchburg, NJ (US); Douglas M Mattingly, Bahama, NC (US)

(73) Assignee: Intersil Americas Inc., Milpitas, CA (US)

( * ) Notice: Subject to any disclaimer, the term of this patent is extended or adjusted under 35 U.S.C. 154(b) by 335 days.

(21) Appl. No.: 12/860,317

(22) Filed: Aug. 20, 2010

(65) Prior Publication Data

US 2011/0121795 A1 May 26, 2011

Related U.S. Application Data

(60) Provisional application No. 61/263,456, filed on Nov. 23, 2009.

(51) Int. Cl.
*H02J 1/00* (2006.01)
*H02J 3/12* (2006.01)

(52) U.S. Cl. ........ 323/318; 323/320; 323/322; 323/325; 323/282; 323/283

(58) Field of Classification Search .................. 323/318, 323/320, 322, 325, 282, 283, 284
See application file for complete search history.

(56) References Cited

U.S. PATENT DOCUMENTS

| | | | | |
|---|---|---|---|---|
| 5,499,177 | A * | 3/1996 | Ichihara | 363/37 |
| 7,239,102 | B2 * | 7/2007 | Fujimura | 318/400.14 |
| 7,313,005 | B2 * | 12/2007 | Azuma et al. | 363/41 |
| 7,362,152 | B2 * | 4/2008 | Figoli | 327/172 |
| 8,058,932 | B2 * | 11/2011 | Liu et al. | 331/16 |
| 2005/0184700 | A1 * | 8/2005 | Fujimura | 318/807 |
| 2005/0213654 | A1 * | 9/2005 | Figoli | 375/238 |

\* cited by examiner

*Primary Examiner* — Bao Q Vu
(74) *Attorney, Agent, or Firm* — Fogg & Powers LLC

(57) ABSTRACT

A controller and methodology for a power supply are disclosed. The controller includes output channels for providing a pulse width modulation (PWM) voltage signal for driving a load, for example, a microprocessor. Each channel provides a portion of the PWM signal. The controller receives user input information and uses that information to automatically determine window sizes. A window size defines the maximum output current level for a given window. The controller uses feedback signals to determine the current being drawn by the load, and selects the number of windows and channels that are needed to adequately provide that current. The controller selectively activates and deactivates the output channels accordingly. In response a change in the user input information the controller automatically adjusts the window sizes.

20 Claims, 9 Drawing Sheets

US 8,305,070 B2

PROGRAMMABLE POWER SUPPLY CONTROLLER AND METHODOLOGY FOR AUTOMATIC PHASE ADJUSTMENT OF A PWM OUTPUT SIGNAL

CROSS-REFERENCE TO RELATED APPLICATIONS

This application claims the benefit of U.S. Provisional Patent Application Ser. No. 61/263,456 filed on Nov. 23, 2009, and entitled "IMPROVED APPARATUS AND METHODOLOGY FOR AUTOMATIC PHASE ADJUSTMENT OF A PWM OUTPUT SIGNAL OF A PROGRAMMABLE POWER SUPPLY CONTROLLER," the entirety of which is incorporated herein by reference.

DETAILED DESCRIPTION

Figure 1:
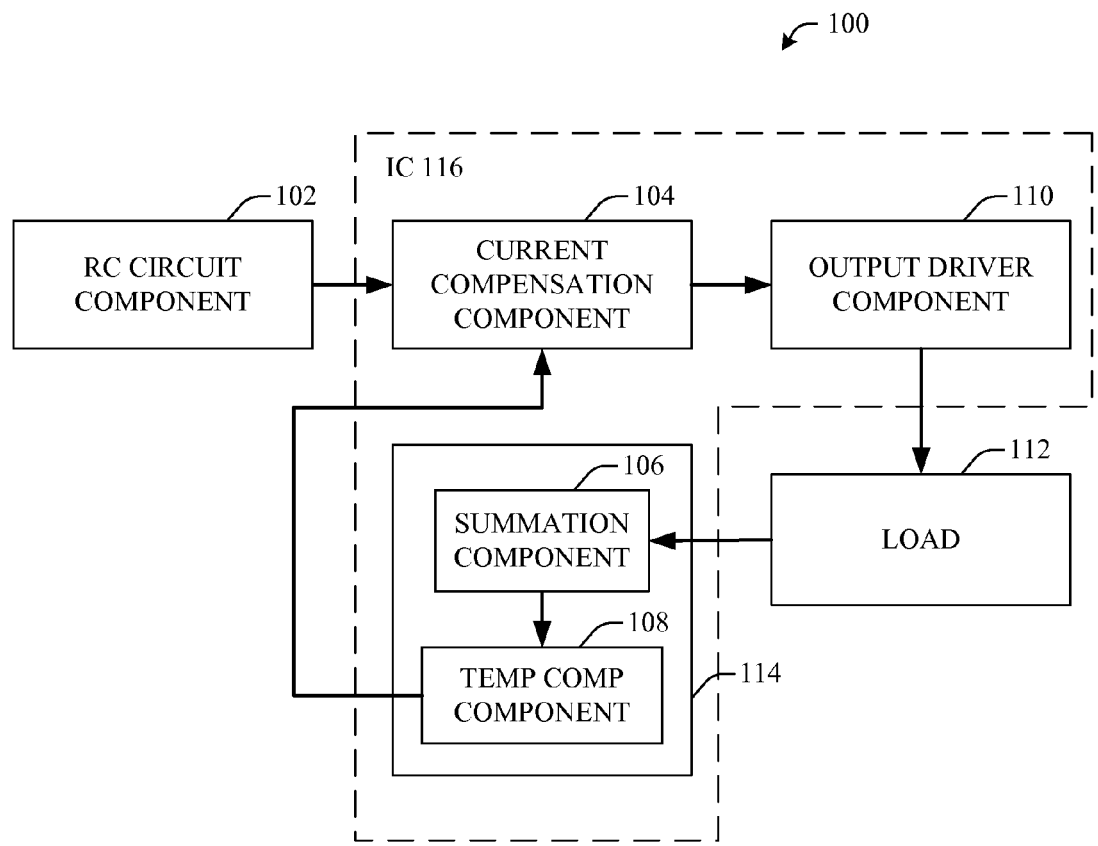
FIG. 1 illustrates an example system for driving a load with a pulse width modulation (PWM) voltage control signal.

Embodiments of the present invention disclose a programmable controller and methodologies for controlling a power supply. The controller includes multiple output channels and generates a pulse width modulation (PWM) output voltage signal for driving a load, for example, a microprocessor load. Each channel provides a portion of the PWM output voltage signal that is time (or phase) shifted in relationship with the portions provided by the other channels. In an embodiment of the present invention, the controller includes six channels, which can be selectively activated and deactivated by the controller, based on the amount of current being drawn by the load. If only one channel is active, minimum current is provided to the load. If two channels are active, an incrementally larger current is provided to the load. If all six channels are active, maximum possible current is provided to the load.

The controller can be user programmable and can set the window sizes for the first and subsequent windows based on user inputs. The window size defines the maximum amount of current that can be provided by a given window. The window size can also refer to the maximum amount of incremental current a window can add to the previous window, depending on the context. The window size determines the number of PWM channels that must be activated to support the load current requirements represented by the window size. The window sizes for the various windows can be different from each other. For example, the window size for the first window can be larger than the maximum incremental currents provided by each of the other window sizes. Also, in the case in which the controller supports, for example, five windows, windows two, three, four and five can have the same window size (i.e the same amount of maximum current increment over the previous window), and window one can have a different window size, for example, twice the size of the other windows.

The user can adjust the window sizes by adjusting the user input. Moreover, the controller can automatically adjust the window sizes in response to the change in the user input. In one embodiment of the present invention, the relationships between the window sizes can be defined in terms of ratios. For example, the window size for the first window can be programmed to be twice the size of all the other windows. In this case, if the user provides the controller with information about the size of any one of the windows, the controller automatically sets the sizes for all the windows based on the programmed ratios. Thus, the controller can adaptively scale the sizes of all the windows based on a user input that defines only the size of any one of the windows.

In an embodiment of the present invention, the total pulse width of the PWM output signal cumulatively generated by all the active channels is based on the window size. Thus, if the window size for window 1 is programmed to be twice the window size for window 2, then the maximum pulse width of the PWM signal generated with respect to window 1 would be twice the length (in time) of the maximum incremental pulse width of the PWM signal generated with respect to window 2. In an embodiment of the present invention, the controller determines the total current being drawn by the load by summing the feedback signals indicative of the currents being provided by each of the output channels. In an embodiment of the present invention, the sum is adjusted for an ambient temperature condition, for example, by using a look-up table, to correct any errors in current measurements caused by temperature variation.

In an embodiment of the present invention, the controller also uses the user input to determine an amount of the hysteresis offset current. In electro-magnetic systems, the hysteresis condition relates to lagging of an effect behind its cause. In an example system of the present invention, if the controller drops a phase (or window) and then adds a phase (i.e cause), the output current generated by the output channels can temporarily lag the output voltage (i.e. effect). The controller provides an offset current to compensate for the hysteresis current loss.

The embodiments of the present invention disclose a controller that is customer (user) programmable and can automatically add and drop phases (i.e. output channels) based on user input and current being drawn by the load. By adaptively adding and dropping phases based on the current being drawn by the load, the controller improves system efficiency and power management and reduces wastage of power. The controller can be implemented on a single integrated circuit chip (IC), multiple ICs, or can be built on one or more ICs in combination with additional analog components that can be implemented inside or outside the IC. The various components of the controller can be implemented in hardware, software or firmware.

In an embodiment of the present invention, the load supported by the controller can include a microprocessor. Microprocessor-based devices have evolved into reliable and pervasive tools that facilitate everyday common tasks (e.g., microwave cooking, automobile ignition systems, entertainment centers . . . ), complex mathematical computations (e.g., trending, controlling a robot, forecasting . . . ), sophisticated applications (e.g., business workflow, word-processing, financial logging, electronic mail . . . ), etc. Such devices typically include one or more processors and various types of memory as well as other components that enable efficient and robust multi-tasking. Incremental advances in electronics, networking and software technologies have resulted in reduced device production costs that have correlated to decreased consumer purchasing costs, which has rendered computers (e.g., desktop, laptop, handheld . . . ) essentially ubiquitous throughout many portions of the world.

With the advancement and increased implementation of microprocessor-based devices, supplying power (e.g., voltage and/or current) for such devices has also evolved. Microprocessor-based devices can control various components as well as employ numerous tasks concurrently. Based on the increase of processing speed and power, these devices often drive loads that require varying amounts of current. For example, a microprocessor-based device may require a first current level for a first task, whereas a second current level (e.g., higher or lower) may be required for a second task.

Pulse width modulation (PWM) is an efficient technique for controlling analog circuits with a microprocessor-based device's digital outputs. In general, PWM provides intermediate amounts of electrical power between fully on and fully off. PWM can be employed in a wide variety of applications, ranging from measurement and communications to power control and conversion. PWM allows for applying partial power in electrical devices such as, but not limited to, microprocessor-based devices. For example, a microprocessor can include output drivers in which each output driver provides a phase of a cumulative PWM output signal. Each output driver can provide a voltage pulse that is shifted in phase from the voltage pulses provided by the other output drivers. For instance, there can be six output drivers and six PWM channels that provide six slices or PWM voltage pulses that are 60 degrees phase shifted from each other for a combined total of 360 degrees. PWM techniques can be efficiently applied to voltage step down applications, for example, voltage step down from 12 volts to 1 volt. In such applications, PWM phases can be integrated to provide the stepped down output voltage without causing power losses.

One or more embodiments are now described with reference to the drawings, wherein like reference numerals are used to refer to like elements throughout. In the following description, for purposes of explanation, numerous specific details are set forth in order to provide a thorough understanding of the various embodiments. However, the various embodiments can be practiced without these specific details. In many instances, well-known structures and devices are shown in block diagram form in order to facilitate describing the embodiments in additional detail.

As used in this application, the terms "component," "module," "system," or the like are generally intended to refer to a computer-related entity, either hardware, a combination of hardware and software, software, or software in execution or an entity related to an operational machine with one or more specific functionalities. Furthermore, the various embodiments can be implemented as a method, apparatus, or article of manufacture using standard programming and/or engineering techniques to produce software, firmware, hardware, or any combination thereof to control a computer to implement the disclosed subject matter. Many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. In addition, the articles "a" and "an" as used in this application and the appended claims should generally be construed to mean "one or more" unless specified otherwise or clear from context to be directed to a singular form.

Referring to FIG. 1, there illustrated is an example system 100 for driving a load with pulse width modulated (PWM) voltage signals, according to an embodiment of the present invention. The system 100 includes a RC (resistor-capacitor) Circuit Component 102 coupled to the Current Compensation Component 104, which, in turn, is coupled to the Output Driver Component 110 and the Feedback Component 114. The Output Drive Component 110 is coupled to the Load 112. The Load 112 is coupled to the Feedback Component 114.

In an embodiment of the present invention, the Current Compensation Component 104, the Output Driver Component 110 and the Feedback Component 114 are located on an integrated circuit chip (IC) 116. The RC Circuit Component 102 receives user input and provides information about the user input to the Current Compensation Component 104. The Current Compensation Component 104 uses the user input information to determine the current window sizes and the value of the hysteresis current. The Current Compensation Component 104 also receives information about the current being drawn by the load 112 from the Feedback Component 114.

Based on the information received from the RC Circuit Component 102 and the Feedback Component 114, the Current Compensation Component 104 selectively activates or deactivates the output channels (i.e. adds or drops phases) of the Output Driver Component 110. In an embodiment of the present invention, the Output Driver Component can be located outside the IC 116, including, for example, on another IC. The Current Compensation Component 104 selectively activates and deactivates the output channels to ensure that adequate current is being provided to the load 112, while also ensuring that output channels are not unnecessarily activated, thereby reducing wastage of power. The Current Compensation Component 104 can also determine the hysteresis offset current level(s) for the output channels.

The Feedback Component 114 includes the Summation Component 106 and the Temperature Compensation Component 108. The Summation Component 106 adds the feedback signals indicative of the currents provided to the load 112 by the various output channels of the Output Driver Component 110. The Temperature Compensation Component 108 makes any adjustment to the sum based on an ambient temperature level, for example, to correct any errors in current measurements caused by a temperature variation. The Temperature Compensation Component 108 can include a look-up table for making the adjustments. The Temperature Compensation Component 108 can also include a low temperature coefficient resistor that can be used to measure current and voltage signals independently of the temperature.

For example, the look-up table can indicate the errors (in Amperes) in current measurements that can result at various ambient temperature levels. Thus, if the system 100 is being employed in a specific high temperature environment, the error amount indicated in the look-up table for that temperature value can be subtracted from the sum determined by the Summation Component 106 (for example) such that the Feedback Component 114 can provide the Current Compensation Component 104 with accurate or improved information about the current being drawn by the load 112.

Figure 2:
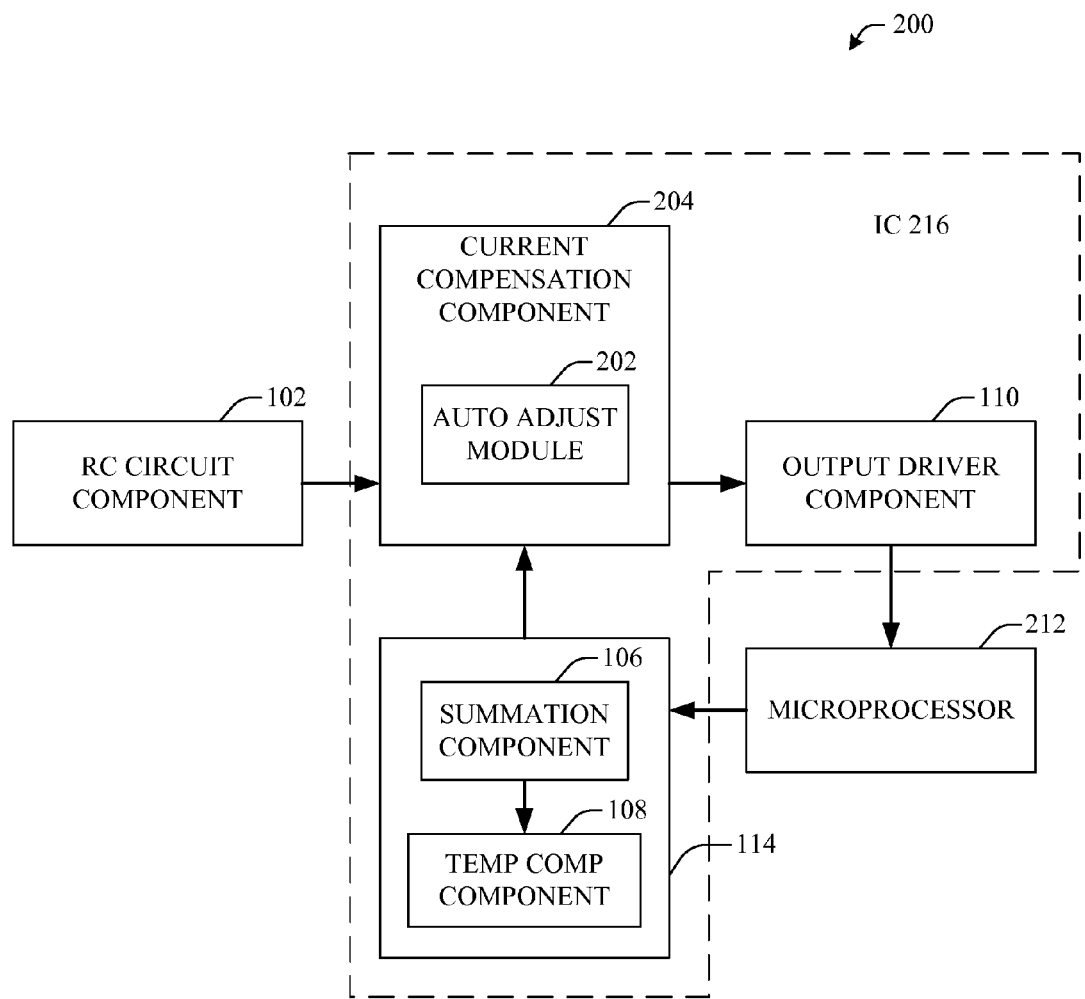
FIG. 2 illustrates an example system that automatically adjusts current windows and hysteresis offset currents for driving a load with a pulse width modulation (PWM) control signal.

Turning now to FIG. 2, there illustrated is another example system 200 for driving a load with pulse width modulated (PWM) voltage signals, according to an embodiment of the present invention. The system 200 includes the RC Circuit Component 102 coupled to the Current Compensation Component 204. The Current Compensation Component 204 includes the Automatic Adjustment Component 202. The Automatic Adjustment Component 202 automatically and adaptively adjusts the window sizes, the hysteresis offset current values and adds or drops phase(s) in response to changes in the user input related information received from the RC Circuit Component 102 and/or changes in load conditions.

The Automatic Adjustment Component 202 can include a programmable module that is user programmable. The Automatic Adjustment Component 202 can include a look up table or an algorithm to determine the window sizes and the hysteresis offset current value based on the user input. The Automatic Adjustment Component 202 can be programmed by using i2c bus and i2c commands by way of the i2c interface of the IC 216.

The Current Compensation Component 204 uses the information received from the RC Circuit Component 102 and the Feedback Component 110 to control the output channels of the Output Driver Component 110. The Output Driver Component 110 generates the PWM voltage signal for driving the microprocessor load 212. The Current Compensation Component 204, the Output Driver Component 110 and the Feedback Component 114 can be located on the IC 216. In an embodiment of the present invention, the Output Driver Component 110 can be located outside the IC 216, including, for example, on another IC.

Figure 3:
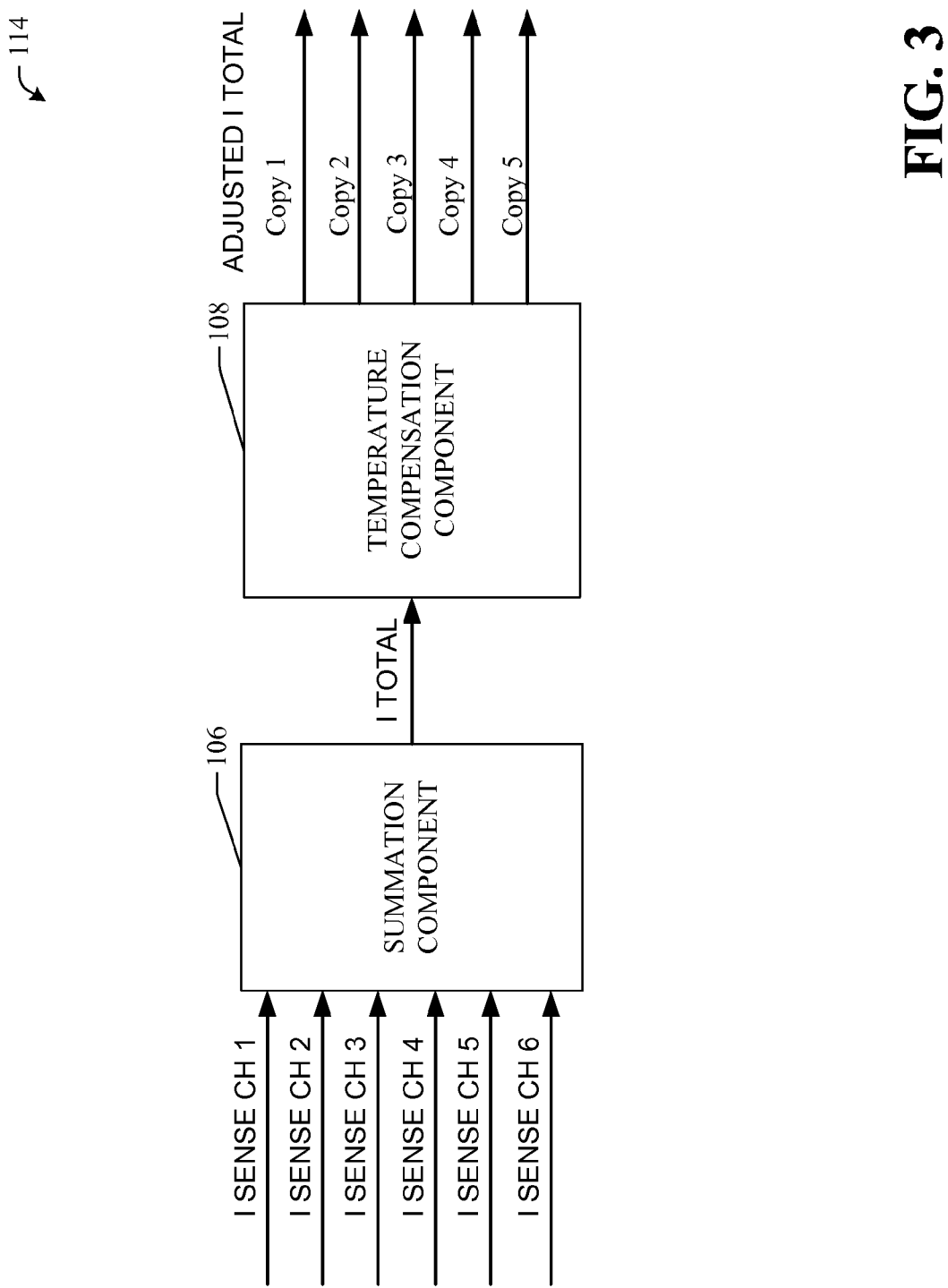
FIG. 3 illustrates inputs and outputs for example summation and temperature compensation modules.

Referring now to FIG. 3, there illustrated are example inputs and outputs for the Feedback Component 114. In an embodiment of the present invention, the Feedback Component 114 includes the Summation Component 106 and the Temperature Compensation Component 108. In another embodiment of the present invention, the Feedback Component 114 does not include the Temperature Compensation Component 108. The Summation Component 106 is configured to ascertain a total current being drawn by the load by summing the feedback signals indicative of the currents provided by each of the output channels. The feedback signals can include full-scale or scaled versions of the sensed voltages for the currents provided by each of the output channels.

In the embodiment illustrated in FIG. 3, the Summation Component 106 receives feedback signals related to six channels. In other embodiments, the Summation Component 106 can receive feedback signals related to various numbers of channels, including, 1, 2, 3, 4, 5, 6, 7, 8 or N channels. The Summation Component 106 generates an output signal indicative of the sum (I TOTAL) of the six feedback signals (I SENSE CH 1, 2, 3, 4, 5 and 6). The Temperature Compensation Component 108 adjusts the I TOTAL signal based on the temperature level, for example, by using a look-up table or an algorithm. The Temperature Compensation Component 108 provides as outputs five copies of the adjusted I TOTAL signal. The Temperature Compensation Block 108 is also capable of scaling the signal received from the Summation Component 106, and in an exemplary embodiment, can output signals indicative of currents that can be measured in micro amperes.

Figure 4A:
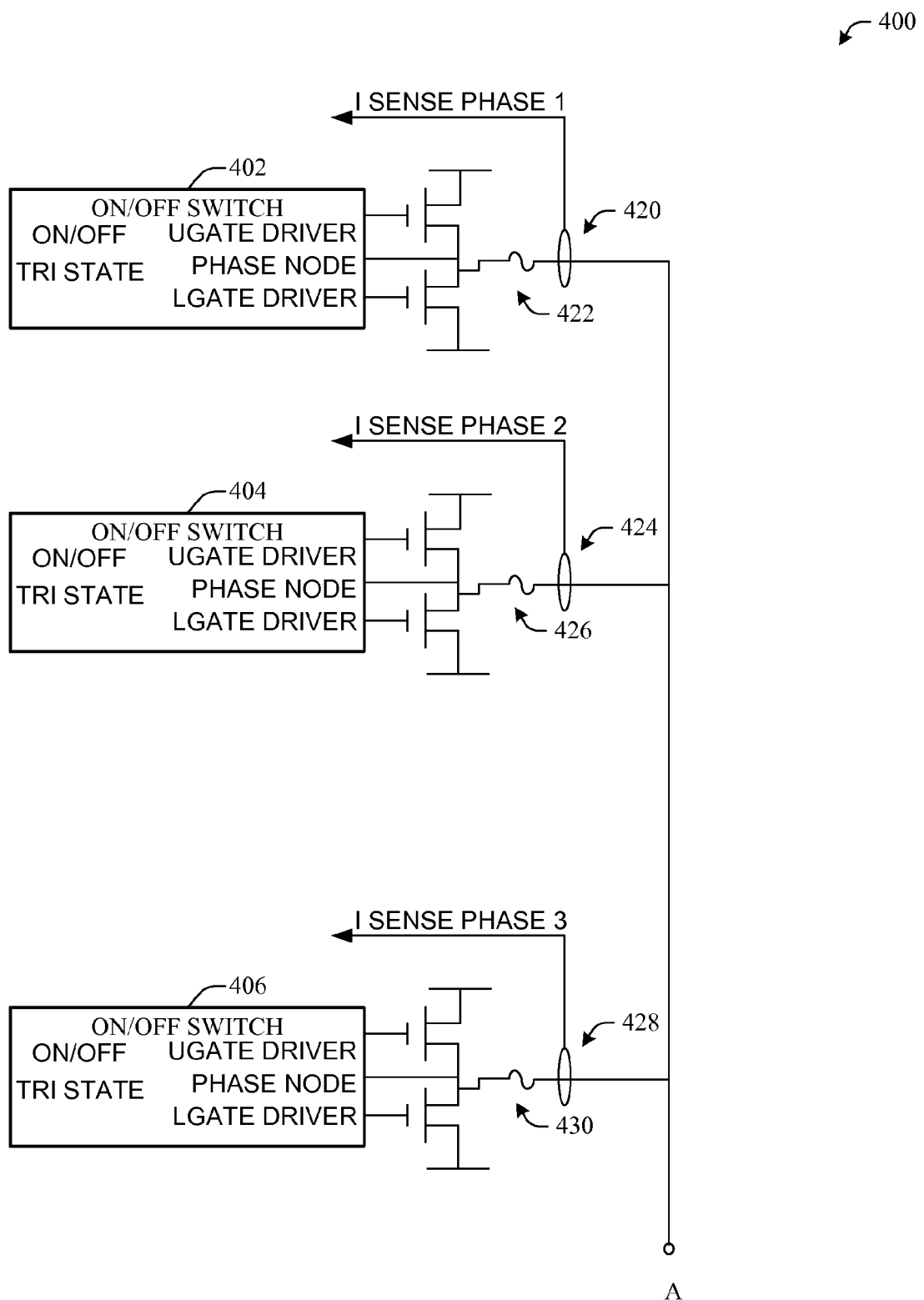
FIGS. 4A and 4B illustrate example output channels.
Figure 4B:
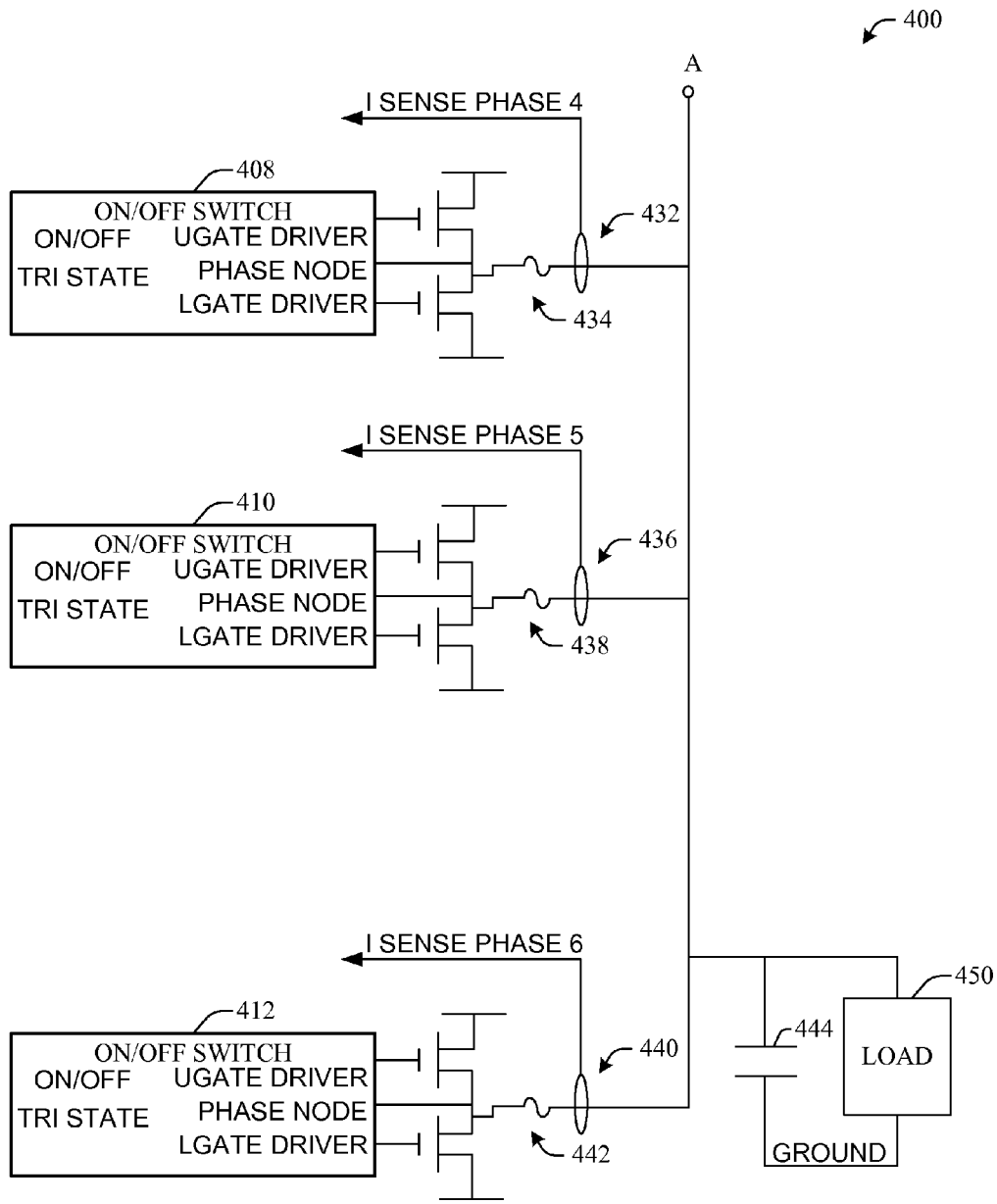

FIGS. 4A and 4B illustrate an example circuitry 400 that supplies power to a load 450 utilizing PWM output channels in accordance with an embodiment of the present invention. The load 450 can include a microprocessor. In an embodiment of the present invention, the output channels 402, 404, 406, 408, 410 and 412 provide the PWM voltage signal for driving the load 450. The exemplary embodiment shown in FIG. 4 includes six output channels 402, 404, 406, 408, 410 and 412. However, various embodiments of the present invention can include other numbers of output channels. Each output channel 402, 404, 406, 408, 410 or 412 provides a slice (or phase) of the cumulative PWM output signal that is provided by the combination of output channels 402, 404, 406, 408, 410 and 412. Each output channel 402, 404, 406, 408, 410 or 412 can provide a voltage pulse that is shifted in phase from the voltage pulses provided by the other five output drivers. Thus, for the exemplary embodiment illustrated in FIGS. 4A and 4B that includes six output channels 402, 404, 406, 408, 410 and 412, the six PWM channels provide six slices of PWM voltage pulses that are 60 degrees phase shifted from each other, wherein the six phases combine for a total of 360 degrees.

Each output channel 402, 404, 406, 408, 410 or 412 either includes output driver circuitry located on the IC 116 or 216, or is coupled to output driver circuitry located externally to the IC 116 or 216. In an embodiment of the present invention, some output channels 402, 404, 406, 408, 410 or 412 include built-in driver circuitry and other output channels 402, 404, 406, 408, 410 or 412 are coupled to driver circuitry located externally to the IC 116 or 216. In the embodiment illustrated in FIGS. 4A and 4B, the PWM channels 402, 404, 406, 408, 410 and 412 include built in output drivers located on the IC 116 or 216.

Each output driver includes the On/off switch that turns on either one of the two transistors coupled to the channels 402, 404, 406, 408, 410 and 412. Each output driver also has the capability not to turn on either of the transistors, which is the tri state condition, which happens when that channel 402, 404, 406, 408, 410 or 412 is off. Regarding the two transistors coupled to each output driver, when the upper transistor is on, power supply is connected to the load. When the lower transistor is on, the load is connected to the ground. The on line inductor 422, 426, 430, 434, 438 or 442 connected to the transistors serves to smooth the current and provides the means for measuring the current. The current sensor 420, 424, 428, 432, 436 or 440 is illustrated by the circle on the wire. The current sensor 420, 424, 428, 432, 436 or 440 can include an RC (resistor-capacitor) network across the inductor 422, 426, 430, 434, 438 or 442 set to unique R and C values, a wire wrapped around the line, or another device or method. The current sense voltage is communicated back to the Summation Component 106 as a feedback signal.

If the current drawn by the load 450 is not adequately supported by a given PWM output signal, that will cause the capacitor 444 (see FIG. 4B) coupled to the load 450 to dissipate voltage in order to provide additional current to the load 450. That, in turn, would cause the PWM output signal to provide a higher duty cycle. The higher duty cycle can be provided by either providing a single phase voltage for a longer period of time or by providing multiple phases of voltage from multiple channels for a shorter duration of time. Providing a multiphase PWM output signal is advantageous because it can be performed with smaller load capacitors than load capacitors required for providing a single phase voltage.

Figure 5:
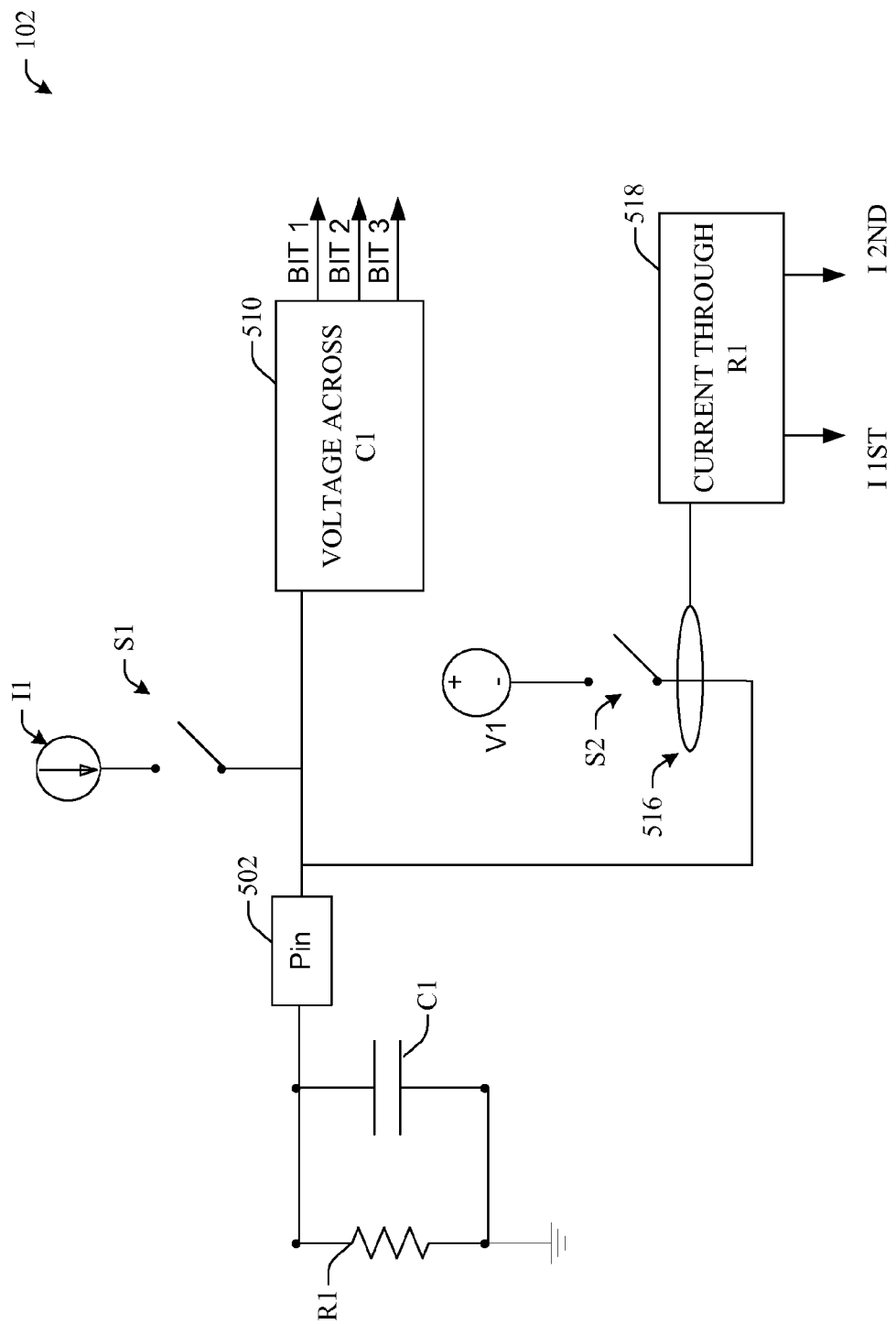
FIG. 5 illustrates an example resistor capacitor (RC) circuit for receiving user inputs and providing corresponding data for desired hysteresis offset currents and window current sizes to the current compensation block.

Referring now to FIG. 5, there illustrated is an example RC Circuit Component 102 that facilitates identifying a hysteresis offset current and window current sizes, according to an embodiment of the present invention. The RC Circuit Component 102 includes a resistor R1 and a capacitor C1, which are user selectable and user changeable. C1 is coupled to the Current Compensation Component 104, 204 by way of the pin 502 for the IC 116, 216 and to the ground. The current source I1 and the switch S1 located in the IC 116, 216 are coupled to C1 by way of the pin 502. During power up, S1 is closed and the C1 is charged by I1 for a time period selected by the user. The time period can be, for example, 100 micro seconds. At the end of the time period, the voltage detection module 510 reads the voltage across C1 and digitizes the voltage into, for example, a 3 bit code, and provides the digitized voltage value to the Current Compensation Module 104 or 204. The Current Compensation Component 104, 204 uses the voltage across C1 to determine the hysteresis offset current. Thus, the user can control the hysteresis offset current by selecting the value of C1, the rate or amount of current provided by I1, or the charging period for C1, or a combination thereof.

R1 is coupled to the pin 502 and to the ground. The band gap voltage source V1 of the IC 116, 216 is coupled to R1 by way of the pin 502 and the switch S2. Following the power up period, switch S1 is opened and switch S2 is closed, which causes a current equal to V1 divided by R1 to flow through R1. The current flowing through R1 is measured (or sensed) by the current measurement module 518 using the inductor 516. The element 516 can also be referred to as a current sensor. Two copies of the values associated with the current flowing through R1 are provided by the module 518 to the Current Compensation Component 104 or 204. In an embodiment of the present invention, I1, 51, S2, V1, current sensor 516 and the modules 510 and 518 are located on the IC 116, 216 and are coupled to the R1-C1 circuitry by way of the IC pin 502. The Current Compensation Component 104, 204 uses the current flowing through R1 to determine the current windows sizes. Thus, the user can control the windows sizes by selecting or changing the value of R1. The Current Compensation Component 104, 204 uses the current and voltage information received from the RC Circuit Component 102 to set up the window sizes and determine the hysteresis offset current.

As discussed above, according to an embodiment of the present invention, the window current size information and the hysteresis offset current level information are communicated by the user to the controller 104, 204 via a single pin 502, i.e. via a RC circuit connected to the single pin 502.

Figure 6:
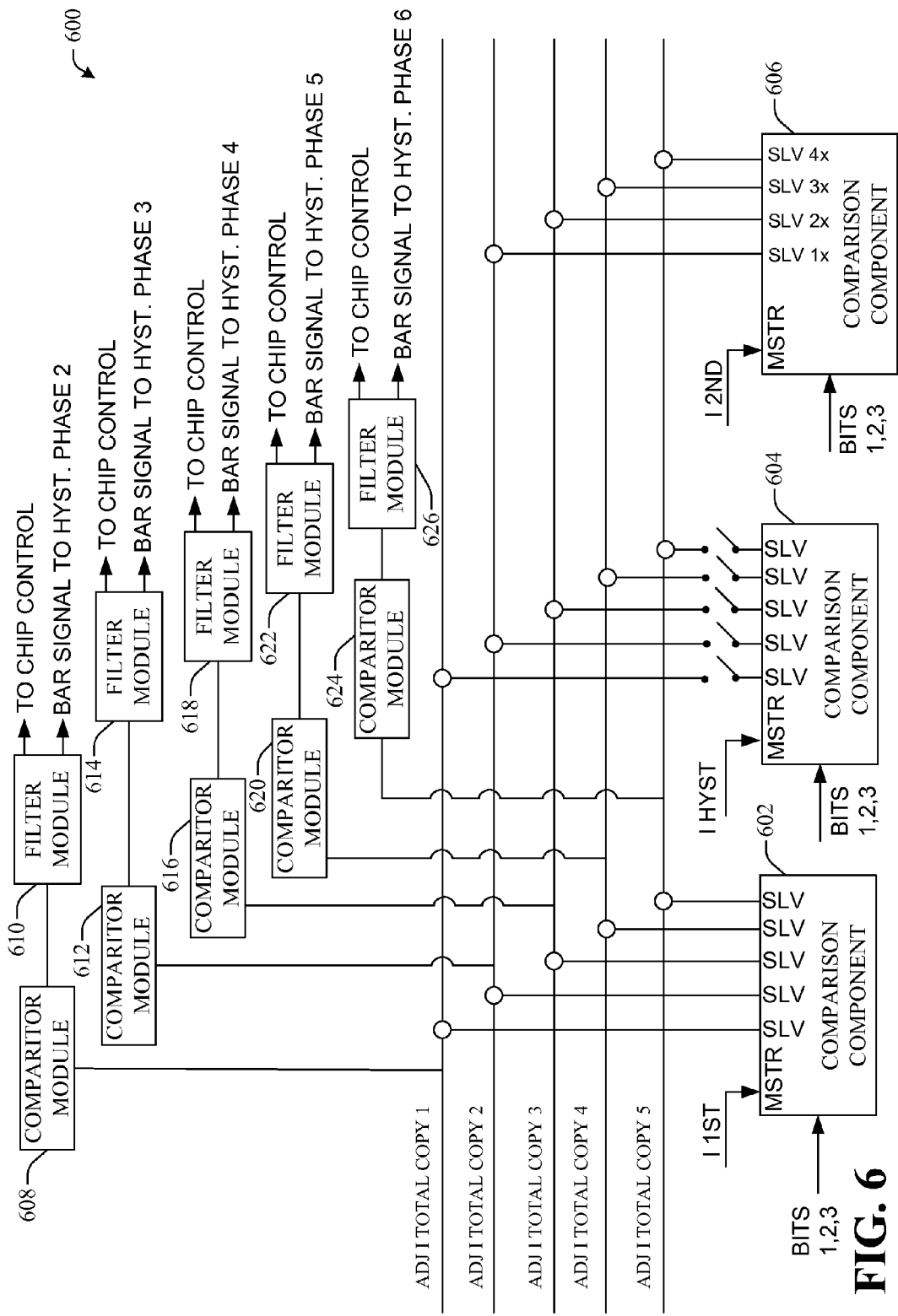
FIG. 6 illustrates an example current compensation block.

FIG. 6 illustrates an example Current Compensation Component 104 or 204. The programming blocks 602 and 606 can be used to set the trip levels to turn on or off a phase, i.e. to add or subtract a channel 402, 404, 406, 408, 410 and 412. As discussed above, the PWM output signal will have a maximum pulse width when all the six channels 402, 404, 406, 408, 410 and 412 are active, minimum pulse width when only one channel 402, 404, 406, 408, 410 or 412 is active, and zero pulse width when none of the channels are active. The pulse width of the PWM output signal is determined by the output voltage that is required for providing adequate current to the load and is limited by the maximum voltage that can be provided by the driver MOS devices shown in FIGS. 4A and 4B.

The following is a brief description of the programming blocks 602, 604 and 606, which can be implemented inside the Current Compensation Component 104 or 204. The programming blocks 602, 604 and 606 provide the capability to program several functions. As illustrated in FIG. 5, the band gap voltage is set across a user provided external resistor and information related to the current flowing through is provided to the programming blocks 602 and 606 to set the size of the first and other windows. The programming blocks 602 and 606 receive the information provided by the module 518, which is indicative of the user's desired window sizes. In an embodiment of the present invention, the two copies of the signal indicative of the R1 current (I $1^{ST}$ and I 2ND) are provided as master current sources to a master diode connected transistor (MSTR) in each of the two programming blocks 602 and 606. The master diode connected transistor controls several window slave transistors (SLV).

The meaning of the term "window," as used in this description, can be illustrated with the following example: for a driving a load that can draw current in the range from 0 amp to 130 amps during operation, the controller of an embodiment of the present invention can be programmed such that the first window would provide 0 to 30 amps to the load by causing one phase or channel to be active, the second window would provide 30 to 50 amps to the load by causing two phases or channels to be active, the third window would provide 50 to 70 amps to the load by causing three phases or channels to be active, the fourth window would provide 70 to 90 amps to the load by causing four phases or channels to be active, the fifth window would provide 90 to 110 amps to the load by causing five phases or channels to be active, and the sixth window would provide 110 to 130 amps to the load by causing six channels or phases to be active.

The information is also used to set the size of the other windows. To set the size of the other windows, i.e., windows 2-6, the programming blocks 602 and 606 determine if the first window was requested by the user to be larger than the other windows and also the size of the other windows in comparison with the first window. The programming block 604 receives information from module 510 and uses it to set the size of hysteresis needed to make a smooth or quiet operation. Hysteresis offset current is added to get good noise immunity. In an embodiment of the present invention, hysteresis offset current is added such that sixty four consecutive PWM cycles of lower current than the window size are provided to turn off a phase and two consecutive PWM cycles of higher current than the window size are provided to turn on a phase. The digital hysteresis number of PWM cycles needed to activate or drop a phase can be programmable through an $i_2c$ interface. Because the hysteresis programming data is derived from the same user input data that includes information for sizing the windows (i.e. data from the R1-C1 circuitry), the hysteresis programming block 604 also tracks the user input data that determines the sizing of the first window and other windows. Thus, the calculation of the hysteresis offset voltage is automatically linked to the windows parameters and the hysteresis offset voltage can be automatically and adaptively adjusted if the user input data for the windows changes.

The programming blocks 602, 604 and 606 also perform the current comparison that sets the correct number of phases operating at any particular time. The programming blocks 602, 604 and 606 receive the following signals indicative of the total current sense voltage. The first programming block 602, which sets up the first window's parameters, receives 5 copies of the output signal of the Temperature Compensation Block 108 that is indicative of the total sensed current voltage for the load 112, 212 or 450. The second programming block 604, which controls the hysteresis circuitry, also receives 5 copies of the output signal of the Temperature Compensation Block 108. The third programming block 606, which sets up the parameters for the remaining windows, receives 4 copies of the output signal of the Temperature Compensation Block 108.

Each phase is associated with a pre-determined, but programmable, pull down current value. If the total sensed current (i.e. ADJUSTED I TOTAL) is larger than the pull down current associated with a given phase, it means that particular phase should be on. The comparison is performed by using the Comparator Modules 608, 612, 616, 620 and 624. The result of the comparison is provided to a plain inverter and then to a filter module 610, 614, 618, 622 or 626. The filter module 610, 614, 618, 622 or 626 is used for two reasons. One, to turn on the hysteresis current associated with a given phase if that phase is off. The reason being that additional current is needed to turn on a phase that is off, to prevent the output from oscillating. Two, the filter module information is provided to the Output Driver Component 110, to physically and electrically turn off output channel(s). In an embodiment of the present invention, to accomplish a proper turn off, many factors are considered, for example, properly spacing the phases and adjusting current balance among many components.

In an embodiment of the present invention, the PWM output signal is generated by using up to six phases, wherein the window sizes of five of the six windows (windows 2 to five) are the same. The information below relates to the determination of when to add a phase, i.e. to go from x phases on to x+1 phases, for this embodiment: From 5 to 6 phases: I total>($1^{st}$ window current+4x $2^{nd}$ window current+1x hysteresis); From 4 to 5 phases: I total>($1^{st}$ window current+3x $2^{nd}$ window current+1x hysteresis); From 3 to 4 phases: I total> ($1^{st}$ window current+2x $2^{nd}$ window current+1x hysteresis); From 2 to 3 phases: I total>($1^{st}$ window current+1x $2^{nd}$ window current+1x hysteresis); and From 1 to 2 phase: I total>$1^{st}$ window current+1x hysteresis; wherein I total represents the total current being drawn by the load. I total can refer to either the output of the Summation Component 106 or the Temperature Compensation Component 108. The window current can be obtained from the slave transistors, Similarly, the following is the description of the borders, as the number of active phases are lowered from 6 to 5 to 4 to 3 to 2 then to 1: From 6 to 5 phases: I total<($1^{st}$ window current+ 4x $2^{nd}$ window current); From 5 to 4 phases: I total<($1^{st}$ window current+3x $2^{nd}$ window current); From 4 to 3 phases: I total<($1^{st}$ window current+2x $2^{nd}$ window current); From 3 to 2 phases: I total<($1^{st}$ window current+1x $2^{nd}$ window current); and From 2 to 1 phase: I total<$1^{st}$ window current.

To permanently change window sizes and hysteresis offset current values, the user needs to change only the master to the $1^{st}$ window, the $2^{nd}$ window, or the hysteresis master diode. If the user wants make adjustments, without using metal mask in the process, the user can program with enhanced flexibility and ease by using the digital code as set by the capacitor C1 coupled to the external pin 502 and the current flowing through the resistor R1. Also, in an exemplary embodiment of the present invention, i2c bus can be used in parallel with the RC Circuit Component 102 to change any and all programming.

An advantage of the controller of the embodiments of the present invention is that if the first window is modified, that automatically adjust all the other windows. No more mirrors or sizes are adjusted, which can be hard to match. Also, if the $2^{nd}$ window is adjusted, all windows above it, i.e. windows 3-6 are automatically adjusted. Also, since all programming data is derived from a common place, for example, the external capacitor C1 and the external resistor R1, all the windows track each other. Any and all windows can be trimmed and adjusted with internal fuses. In one embodiment, the system can also be adjusted to make different windows of different sizes, and automatically adjusting windows sizes upon occurrence of a triggering event. In an embodiment of the present invention, the controller includes a fast response capability such that if in the case of large changes or fluctuations in the load current (di/dt), the controller turns on two or all unused phases. For fast di/dt, the number of phases added per size of actual dv/dt event is programmable through an i2c interface.

Figure 7:
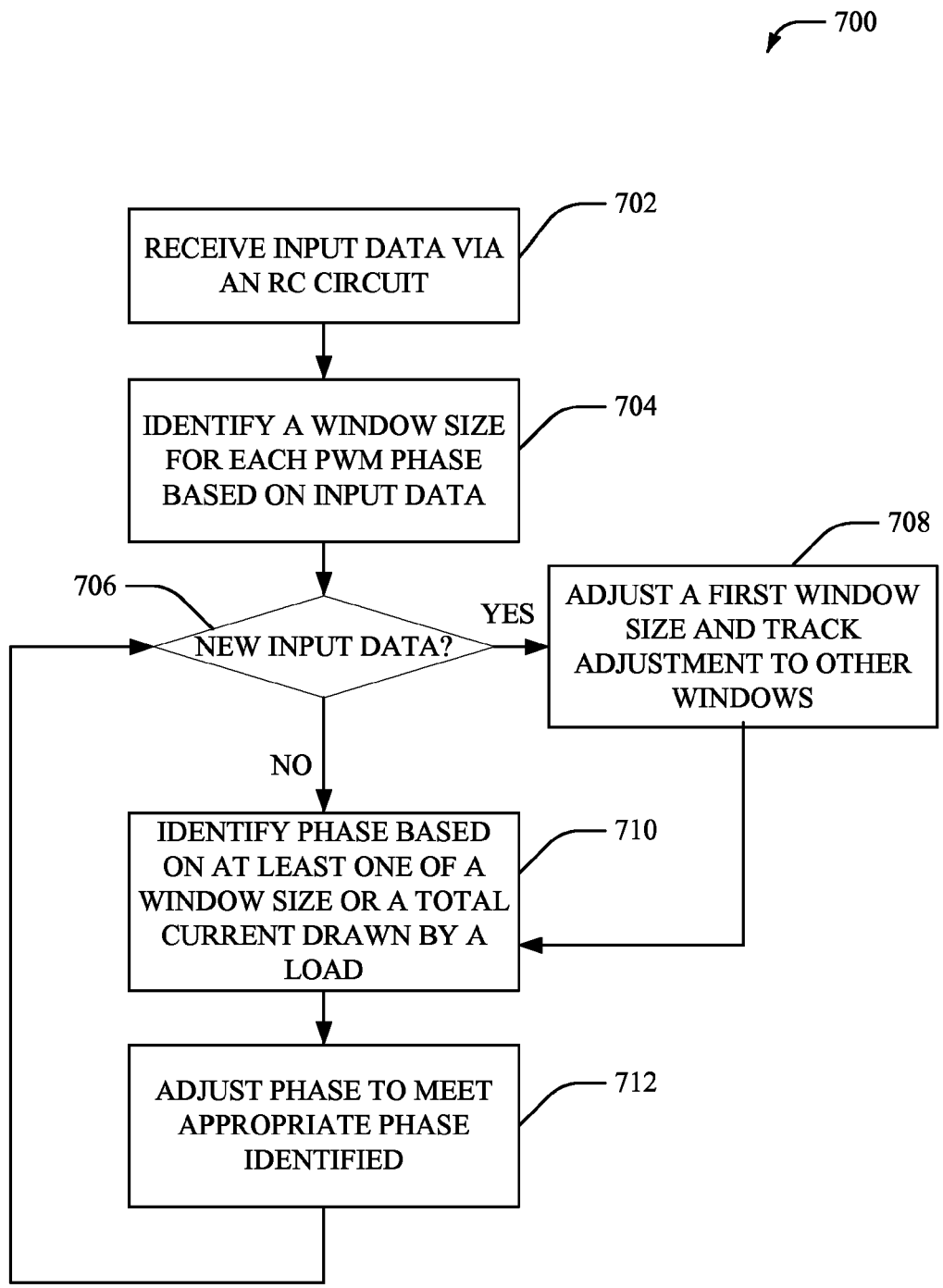
FIG. 7 illustrates an example methodology for adjusting the PWM phase.
Figure 8:
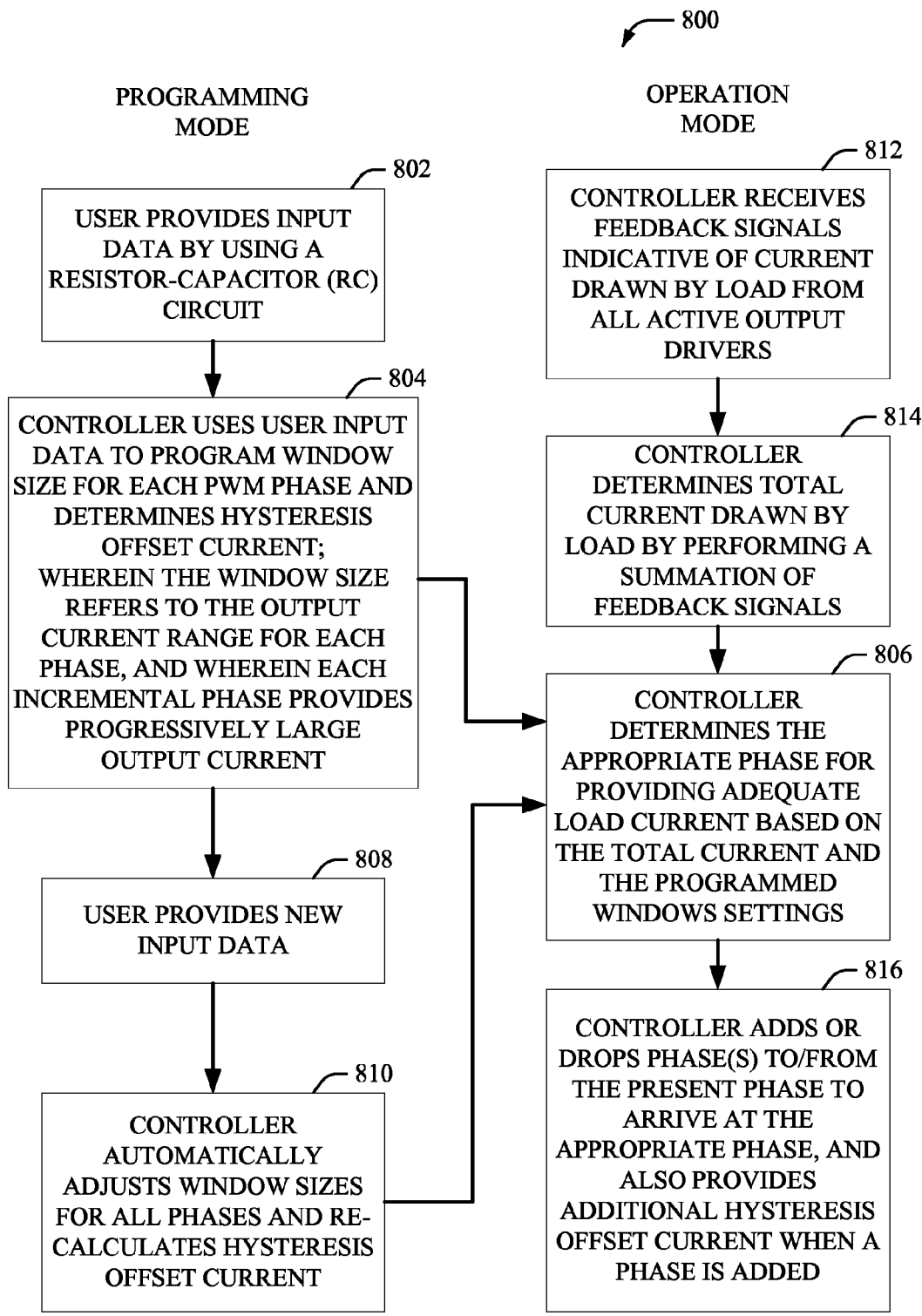
FIG. 8 illustrates an example methodology for driving a load.

FIGS. 7 and 8 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring to FIG. 7, there illustrated is an example methodology 700 that can be employed to ascertain a window current size for each of a set of windows in order to provide PWM power to a load, according to an embodiment of the present invention. At reference numeral 702, user input data can be received via a resistor-capacitor (RC) circuit. For example, the user input data can be a resistance for the resistor and a capacitance for the capacitor. In general, the RC circuit can be external to a controller that provides power to a load. At reference numeral 704, a window size (e.g., window current size) can be identified for each pulse width modulation (PWM) phase based upon the user input data via the RC circuit. It is to be appreciated that the window current size can be identified for a first window and a second window, wherein the first window current size is greater than the second window current size. Moreover, it is to be appreciated that the second window current size will be matched or equal to the remaining window current sizes regardless of the total number of windows employed to correspond to a number of output drivers for a load. In one embodiment, the second window current size can be greater than the first window current size.

At reference numeral 706, a determination is made whether new input data is detected. If new input data is detected, the methodology continues to reference numeral 708. If new input data is not detected, the methodology continues to reference numeral 710. At reference numeral 708, a first window size can be adjusted and such adjustment can be tracked to remaining windows in the total set. At reference numeral 710, a phase can be identified based on at least one of a window current size or a total current drawn by a load. At reference numeral 712, phases are adjusted in order to match the appropriate phase identified. For example, a load can require four (4) phases based on the total current drawn by the load and such phases can be added or subtracted (e.g., adjusted) in order to reach such level of phases. Thus, if the appropriate phase identified based on the current drawn by a load is four (4) and the number of phases active is three (3), a single phase will be added or activated in order to match the appropriate phase.

In still another example, the RC circuit can be utilized to efficiently manage the window current sizes for the total number of windows utilized to provide PWM for driving a load. Based on the user input, the window current sizes for all windows can be easily managed and configured. For instance, by leveraging the RC circuit, the window current size for the first window and the second window can be configured in which remaining windows will automatically track or match such sizes determined by the RC circuit. Moreover, the RC circuit incorporates a hysteresis offset current in order to compensate for hysteresis for a smooth and/or quiet operation (discussed in more detail in FIG. 8).

FIG. 8 illustrates an example methodology 800 for driving a load, according to an embodiment of the present invention. Methodology 800 can include a programming mode and an operation mode. It is to be appreciated that the series of acts described can be associated with the programming mode and/or the operation mode. At reference numeral 802, a user input can provide input data utilizing a resistor-capacitor (RC) circuit. For instance, the user input can be a resistor value and/or a capacitor value for the resistor or capacitor within the RC circuit. It is to be appreciated that the values for the resistor and/or the capacitor can be used to adjust a window current size and/or the hysteresis offset current.

At reference numeral 804, a controller can utilize the user input data to program a window current size for each pulse width modulation (PWM) phase and determine hysteresis offset current. It is to be appreciated that the window current size can relate to the output current range for each phase, wherein each incremental phase provides progressively larger output current. For example, there can be six (6) phases and six (6) corresponding windows in which the first window current size can be 30 amps, a second window current size can be 20 amps, a third window current size can be 20 amps, a fourth window current size can be 20 amps, a fifth window current size can be 20 amps, and a sixth window current size can be 20 amps. In such example, if a load requires 80 amps, there can be four phases activated utilizing the first window current size to the fourth window current size (e.g., 30 amps+ 20 amps+20 amps+20 amps=90 amps to satisfy the required 80 amps).

From reference numeral 804, the methodology 800 can proceed to reference numeral 806 and/or reference numeral 808. At reference numeral 806, the controller can determine an appropriate phase for providing adequate load current based on the total current identified (see reference numeral 814) and the programmed window current size (see reference numeral 804). Following the previous example with 6 windows for 6 phases, the total current can be 120 amps. In such example, the appropriate phase can include 6 phases with the 6 windows (e.g., 30 amps+20 amps+20 amps+20 amps+20 amps+20 amps=130 amps). In a substantially similar example, the total current can be 60 amps in which the appropriate phase can include 3 phases with 3 windows (e.g., 30 amps+20 amps+20 amps=70 amps). Again, it is to be appreciated that any suitable number of phases and corresponding windows can be employed in embodiments of the present invention.

At reference numeral 808, updated input data can be provided by, for example, a user or entity (e.g., machine, computer, group of users, company, corporation, etc.). For instance, the updated input data or new input data can be a change in the resistor value and/or capacitor value in order to identify an updated window current size or an updated hysteresis offset current. In one example, a resistor value can be adjusted or changed in order to employ a disparate window current size for the first window and remaining windows in the set. At reference numeral 810, the controller can automatically adjust window current sizes for all phases and re-calculate hysteresis offset current based upon the new input data or updated input data. From reference numeral 810, the methodology 800 can continue to reference numeral 806.

At reference numeral 812, the controller can receive feedback signals indicative of current drawn by the load from active output drivers. At reference numeral 814, the controller can determine a total current drawn by the load by performing a summation of such received feedback signals. In addition, although not depicted in FIG. 8, the summation of the total current can include a temperature compensation to adjust current based on varying temperatures. From reference numeral 814, the methodology 800 can continue to reference numeral 806. At reference numeral 806 (as previously discussed), the controller can determine an appropriate phase for providing adequate load current based on the total current and the programmed window settings (e.g., number of windows, window current size, etc.).

At reference numeral 816, the controller can add or drop phase(s) to/from a present phase to arrive at the appropriate phase. Moreover, the controller can provide additional hysteresis offset current when a phase is added. Following the previous example having 6 phases with 6 corresponding windows, the total current can be go from 120 amps to 80 amps. Thus, the present phase can be 6 phases in which 6 windows can be utilized (e.g., 30 amps+20 amps+20 amps+20 amps+ 20 amps+20 amps=130 amps). Based on the detected total current going from 120 amps (e.g., the present phase with present windows) to 80 amps (e.g., the appropriate phase with appropriate windows), the controller can drop phases in order to provide the appropriate current of 80 amps utilizing the 4 phases and 4 windows (e.g., 30 amps+20 amps+20 amps+20 amps=90 amps). In other words, it is to be appreciated that the appropriate phase can be a target phase relating to a target current for the load during a cycle in which the target current can be provided with the windows corresponding to the phases. Moreover, it is to be appreciated that the present phase can be a phase relating to a current the load required at a previous moment in time.

It can be appreciated that the components and circuitry elements described above can be any suitable value in order to implement embodiments of the present invention. For example, the resistors can be any suitable resistance, amplifiers can provide any suitable gain, voltage sources can provide any suitable voltage, current sources can employ any suitable amperage, etc. Moreover, what has been described above includes examples of embodiments of the present invention. It is, of course, not possible to describe every conceivable combination of components or methodologies for purposes of describing the claimed subject matter, but one of ordinary skill in the art may recognize that many further combinations and permutations of the embodiments of the present invention are possible. Accordingly, the claimed subject matter is intended to embrace all such alterations, modifications, and variations that fall within the spirit and scope of the appended claims.

What is claimed is:

1. A controller, comprising:
    a plurality of output channels for providing a pulse width modulation (PWM) signal;
    a first module configured to receive user input information and use the user input information to automatically determine a window size for each of the plurality of output channels; and
    a second module for selectively activating and deactivating one or more of the plurality of channels; wherein,
    each output channel for providing a portion of the PWM signal;
    the window size defining a maximum output current level for the channel; and
    the second module for selectively activating and deactivating based on the current requirement of a load.

2. The controller of claim 1, wherein the load is a microprocessor.

3. The controller of claim 1, wherein the second module selectively activates or deactivates a channel based on a comparison between a predetermined reference current value and the amount of current required by the load.

4. The controller of claim 3, further comprising:
a third module for determining the amount of current required by the load; wherein,
the third module for summing the current output for each channel; and
the third module for adjusting the sum based on an ambient temperature condition.

5. The controller of claim 1, further comprising:
the second module for determining a hysteresis offset current level by using the user input information; wherein,
the plurality of output channels use the hysteresis offset current for compensating for a hysteresis condition caused by reduction and subsequent increase of the voltage output by the plurality of output channels.

6. The controller of claim 1, the controller is implemented on an integrated circuit chip.

7. The controller of claim 1, wherein the number of channels includes six channels.

8. The controller of claim 7, further comprising: the windows include a first window defining a first current size, a second window defining a second current size, a third window defining a third current size, a fourth window defining a fourth current size, a fifth window defining a fifth window size, and a sixth window defining a sixth current size.

9. The controller of claim 8, wherein the first current size is greater than the second current size and the second current size is substantially equal to the third current size, fourth current size, fifth current size, and the sixth current size.

10. The controller of claim 9, wherein the first current size for the first window is determined by the circuit external to the controller.

11. The controller of claim 10, wherein the second current size, the third current size, the fourth current size, the fifth current size, and the sixth current size automatically track the first current size of the first window.

12. The controller of claim 10, wherein the external circuit includes a resistor-capacitor circuit.

13. The controller of claim 11, wherein the first window defines a larger current size than the other windows.

14. The controller of claim 13, wherein the first, second and third modules can be implemented in hardware, software or firmware.

15. A power supply, comprising:
a resistor-capacitor (RC) circuit for providing information related to an user input;
a controller for using the information related to the user input for determining sizes for a plurality of windows;
a plurality of output channels including driver circuitry for providing a PWM voltage signal;
a feedback component for determining the amount of current required for a load; and
the controller for selectively activating one or more of the plurality of output channels based on the number of windows that are required to provide the amount of current required for the load; and
the controller for automatically changing the sizes of the plurality of windows in response to a change in the user input information; wherein,
the window size defines the maximum current level for the window; and
each output channel incrementally increases the pulse width of the PWM voltage signal.

16. The power supply of claim 15, wherein the feedback component including:
a summation component for summing the signals indicative of the currents provided by each of the plurality of output channels; and
a low temperature coefficient temperature resistor for adjusting the sum to compensate for a temperature value.

17. The power supply of claim 15, wherein,
the plurality of windows includes six windows; and
the first window size and the second window size are determined by the RC circuit and the third window size, the fourth window size, the fifth window size, and the sixth window size mirror the second window size.

18. The power supply of claim 15, wherein,
the RC circuit for providing information to the controller through a single pin; and
the information including information for determining a window current size and a hysteresis offset current level.

19. The system of claim 15, further comprising:
the controller for determining a hysteresis offset current level by using the user input information; wherein,
the plurality of output channels for using a hysteresis offset current to compensate for a hysteresis condition caused by reduction and subsequent increase of output voltage for the plurality of output channels.

20. A method for a power supply, comprising:
receiving data;
using the data for programming a window current size for each of a plurality of PWM phases, wherein a number of a plurality of windows corresponds to a number of the plurality of PWM phases, and wherein the window current size refers to the output current level for each phase wherein each incremental phase provides a progressively larger output current;
determining a hysteresis offset current based on the data;
receiving feedback signals indicative of currents drawn by a load;
summing the feedback signals;
adjusting the sum of the feedback signals based on an ambient temperature condition by using a low temperature coefficient resistor;
ascertaining an appropriate number of phases for providing adequate load current based on the adjusted sum of the feedback signals and the programmed window current sizes for each of the number of windows;
employing at least one of an add or a drop of at least one PWM phase from a present number of phases to arrive at the appropriate number of phases;
incorporating the hysteresis offset current upon a detected drop and subsequent add of a phase;
receiving new data; and
automatically adjusting at least one of the following based upon the received new data: the number of phases; the current size of at least one window; or the hysteresis offset current.

* * * * *